K. E. RUDD.

Gate.

No. 8,149. Reissued April 2, 1878.

Attest:
Jno. D. Madigan
Jno. P. Brooks

Inventor:
Karl E. Rudd,
by C. A. Snow & Co.
Attorneys.

N. PETERS, PHOTO-LITHOGRAPHER, WASHINGTON, D. C.

UNITED STATES PATENT OFFICE.

KARL E. RUDD, OF CASSOPOLIS, MICHIGAN.

IMPROVEMENT IN GATES.

Specification forming part of Letters Patent No. 195,538, dated September 25, 1877; Reissue No. 8,149, dated April 2, 1878; application filed January 10, 1878.

*To all whom it may concern:*

Be it known that I, KARL E. RUDD, of Cassopolis, in the county of Cass and State of Michigan, have invented certain new and useful Improvements in Gates; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to that class of gates which are commonly known as "tilting gates;" and it consists in the combination of a sliding gate with parallel pivoted bars, or "tilting bars," having rollers upon which the gate slides, and a slot engaging with a pin in the gate, for the purpose of lifting the gate in opening, and pushing it back in closing, substantially as hereinafter more fully described.

Figure 1:
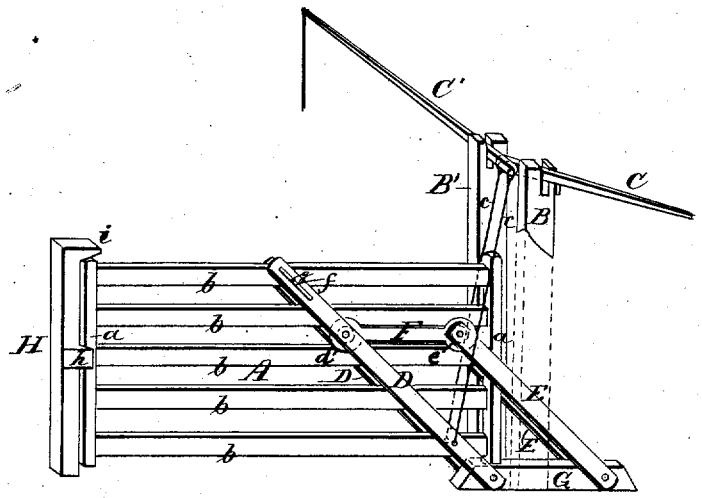
Figure 2:
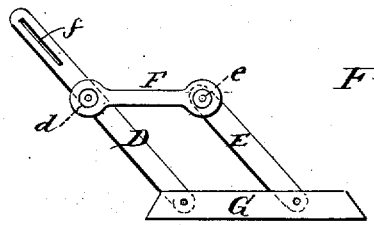

In the drawing hereto annexed, Figure 1 represents a perspective view of the gate closed, showing also its operating-levers; and Fig. 2 is a detail view of the tilting bars.

Similar letters of reference indicate corresponding parts in both the figures.

A is the gate, which is of the usual construction, and consists of the end pieces *a a* and parallel slats *b*. B B′ are two posts, between which the gate, when opened or closed, moves in a vertical plane. Pivoted in the upper ends of these posts are the operating-levers C C′, to the short ends of which are secured cords or rods *c c*, which reach down to the lower rearward part of the parallel tilting bars D D, of which there is preferably one on each side of the gate.

E E is the second pair of tilting bars, parallel to D D, and preferably united thereto by a connecting-bar, F. The lower ends of bars D and E are pivoted in a block or base, G, and rollers (denoted by *d e*) are inserted between each pair, (when these bars are constructed in pairs,) which work between two of the slats *b b* of the gate.

The upper end of the forward bar D has a slot, *f*, which works on a pin, *g*, secured in the upper slat, for the purpose of drawing back the gate in opening, and pushing it forward in closing.

From the foregoing description, taken in connection with the drawing, the operation of my improved gate will be readily understood. The gate is shifted or tilted to open it by depressing levers C C′, and will, in opening, move in a vertical plane in a combined horizontal and circular direction, so that any fixed points in the gate will, in opening or closing, describe the arc of an ellipse.

The weight of the gate has only to be sustained or exerted to lift it to a height corresponding to one-half of the minor axis of the ellipse, it being sustained and supported by the tilting bars and rollers during the motion of the gate through the space corresponding to the length of the major axis, so that it requires comparatively little power to open or close it.

Besides supporting the gate in opening and closing, the bars D E serve as braces, giving rigidity to the gate and strengthening the entire structure; and by providing the latch-post H with projections *h i* at the sides and top, which project over the sides and top of the end piece *a*, the gate will be held firmly in its vertical position when closed, while the lip or projection *i* will prevent hogs or cattle from raising or opening the gate.

As the gate, in opening, starts slightly back before rising, the lip *i* will not interfere with the opening.

Having thus described my invention, I claim and desire to secure by Letters Patent of the United States—

1. The pivoted tilting bars D E, having wheels or rollers *d e* and slot *f*, substantially as and for the purpose herein shown and described.

2. The combination of a sliding or tilting gate, A, with the pivoted tilting bars D E, having wheels or rollers *d e*, substantially as and for the purpose herein shown and described.

3. The combination of the gate A, having pin *g*, with the pivoted bar D, having roller *d* and slot *f*, substantially as and for the purpose herein shown and described.

4. The combination of the gate A, having pin *g*, with the tilting frame, consisting of the parallel pivoted bars D E, having wheels or rollers *d e* and slot *f*, and connecting-bar F, substantially as and for the purpose herein shown and described.

In testimony that I claim the foregoing I have hereunto set my hand this 15th day of November, 1877.

Witnesses: KARL E. RUDD.

O. RUDD,

GEORGE KETCHAM.